(12) United States Patent
Wielandy

(10) Patent No.: US 10,186,826 B2
(45) Date of Patent: Jan. 22, 2019

(54) WIDELY AND RAPIDLY TUNABLE MULTI-WAVELENGTH LASER

(71) Applicant: LGS INNOVATIONS LLC, Herndon, VA (US)

(72) Inventor: Stephan Frank Wielandy, Madison, NJ (US)

(73) Assignee: LGS Innovations LLC, Herndon, VA (US)

( * ) Notice: Subject to any disclaimer, the term of this patent is extended or adjusted under 35 U.S.C. 154(b) by 0 days.

(21) Appl. No.: 15/685,067

(22) Filed: Aug. 24, 2017

(65) Prior Publication Data

US 2018/0166846 A1 Jun. 14, 2018

Related U.S. Application Data

(62) Division of application No. 14/972,473, filed on Dec. 17, 2015, now Pat. No. 9,780,521.

(51) Int. Cl.
| | |
|---|---|
| *H01S 3/094* | (2006.01) |
| *H01S 3/13* | (2006.01) |
| *H01S 3/30* | (2006.01) |
| *H01S 3/067* | (2006.01) |
| *H01S 3/10* | (2006.01) |
| *H01S 3/08* | (2006.01) |

(52) U.S. Cl.
CPC .... *H01S 3/094096* (2013.01); *H01S 3/06754* (2013.01); *H01S 3/08086* (2013.01); *H01S 3/094053* (2013.01); *H01S 3/10084* (2013.01); *H01S 3/13* (2013.01); *H01S 3/302* (2013.01); *H01S 2301/02* (2013.01)

(58) Field of Classification Search
CPC ...... H01S 3/094096; H01S 3/302; H01S 3/13; H01S 3/094053
See application file for complete search history.

(56) References Cited

U.S. PATENT DOCUMENTS

| | | | | |
|---|---|---|---|---|
| 2002/0015220 | A1* | 2/2002 | Papernyl | H04B 10/2916 359/334 |
| 2013/0223459 | A1 | 8/2013 | Radic | |

* cited by examiner

*Primary Examiner* — Dung Nguyen
(74) *Attorney, Agent, or Firm* — Baker & Hostetler LLP

(57) ABSTRACT

The present application describes a method for controlling an output of a laser apparatus. The method includes a step of receiving, at the first multiplexer, an initial wavelength from a pump. The method also includes a step of receiving first and second seed wavelengths from a first and a second seed source, respectively. The method also includes a step of sending an output of the combiner to a first fiber. The method includes a step of combining, at a second multiplexer, an output of the first fiber. The method also includes a step of extracting the initial wavelength with the second multiplexer. Further, the method includes a step of sending the first and seed wavelengths to a second fiber.

15 Claims, 10 Drawing Sheets

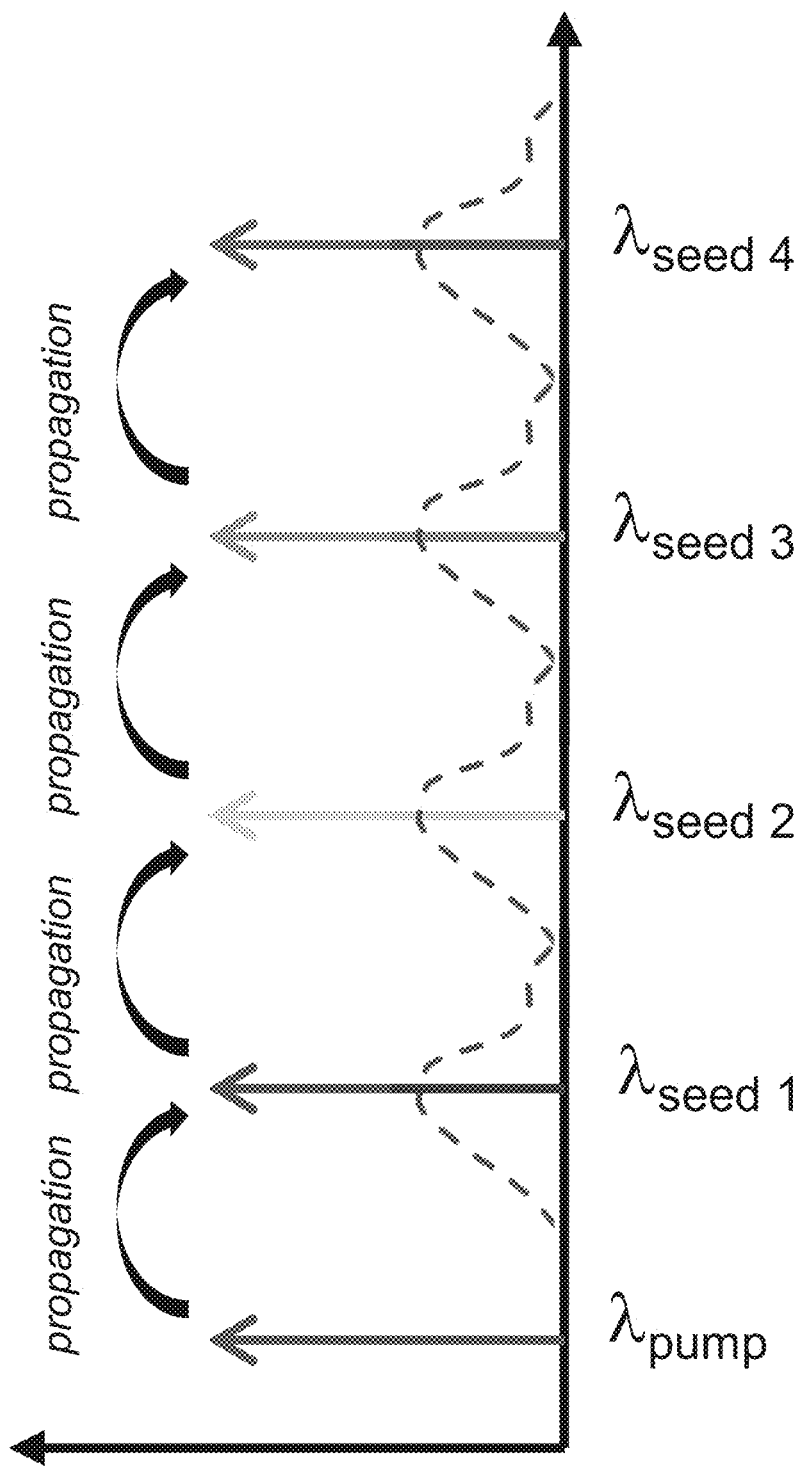

WIDELY AND RAPIDLY TUNABLE MULTI-WAVELENGTH LASER

CROSS-REFERENCE TO RELATED APPLICATIONS

This application is a Divisional of U.S. Ser. No. 14/972,473 filed Dec. 17, 2015, entitled "Widely And Rapidly Tunable Multi-Wavelength Laser" the content of which is incorporated by reference in its entirety herein.

FIELD

The present application generally relates to multi-wavelength lasers. The application is more particularly related to widely and rapidly tunable multi-wavelength lasers.

BACKGROUND

Passive multi- and hyper-spectral imaging techniques are generally employed to detect and identify various objects for government and commercial applications. These applications may include detection of camouflaged objects, homemade explosives, weapons of mass destruction (WMDs) and illegally produced drugs. These applications may also include monitoring industrial pollutants, industrial activity and untapped natural resources. However, passive, multi and hyper spectral imaging have certain disadvantages. For example, they offer poor night-time imaging capability, reduced accuracy in view of the inability to control the illumination source, and inability to operate in some wavelength bands because only narrow atmospheric transmission windows exist in those bands.

Conventional laser technologies, such as Optical Parametric Oscillators (OPOs), may address some of the wide tuning requirements of multi-wavelength lasers. However, these lasers suffer from drawbacks including but not limited to poor robustness for field use, large size, poor efficiency, and slow tuning speed. Separately, while plural, separate lasers could be used to create a multi-wavelength laser system, their size and power consumption result in significant drawbacks as additional wavelengths are added.

What is desired is an active, widely and rapidly tunable, multi-wavelength laser remote sensing (MWLRS) apparatus that provides enhanced functionality in comparison to passive multi- and hyper-spectral imaging systems and overcomes the drawbacks of conventional systems described above.

What is also desired is a MWLRS apparatus offering 2 or 3-D imagery with an enhanced ability to detect, identify, and discriminate a variety of materials over a predetermined number of wavelengths.

What is also desired is an apparatus that can use Raman amplification to controllably transfer power from an initial pump wavelength to one of a plurality of different possible output wavelengths.

SUMMARY

This summary is provided to introduce a selection of concepts in a simplified form that are further described below in the Detailed Description. This Summary is not intended to limit the scope of the claimed subject matter. The foregoing needs are met, to a great extent, by the present application directed to.

According to an aspect, a multi wavelength apparatus is described having the ability to tune an output wavelength between at least three discrete values. The apparatus includes a pump laser at an initial wavelength. The apparatus also includes a first seed laser and a second seed laser. Each of the seed lasers has wavelengths longer than the pump laser.

The apparatus also includes a first multiplexer including an input and an output. The input of the first multiplexer receives the initial wavelength and a first wavelength of the first seed laser. The apparatus also includes a first controller configured to control an output of the first seed laser. The apparatus also includes a second controller that controls an output of the second seed laser.

The apparatus also includes a first fiber including an input and an output. The input of the first fiber is configured to receive the output of the first multiplexer.

The apparatus also includes a second multiplexer including an input and an output. The input of the second multiplexer is configured to receive the output of the first fiber. The output of the second multiplexer is configured to extract light at the initial pump wavelength.

The apparatus also includes a second fiber including an input and an output. The input is configured to receive the output of the second combiner. The second fiber is configured to emit light at either the first seed wavelength or the second seed wavelength.

According to another aspect of the application, a method is disclosed for controlling an output of a laser apparatus. The method includes a step of receiving, at the first multiplexer, an initial wavelength from a pump. The method also includes a step of receiving first and second seed wavelengths from a first and a second seed source, respectively. The method also includes a step of sending an output of the combiner to a first fiber. The method includes a step of combining, at a second multiplexer, an output of the first fiber. The method also includes a step of extracting the initial wavelength with the second multiplexer. Further, the method includes a step of sending the first and seed wavelengths to a second fiber.

DESCRIPTION OF THE FIGURES

In order to facilitate a more robust understanding of the application, reference is now made to the accompanying drawings, in which like elements are referenced with like numerals. These drawings should not be construed to limit the application and are intended only to be illustrative.

FIG. 1 illustrates how multi-ordered cascaded Raman generates light at wavelengths as the light propagates through a fiber according to an embodiment of the application.

DETAILED DESCRIPTION

Figure 2A:
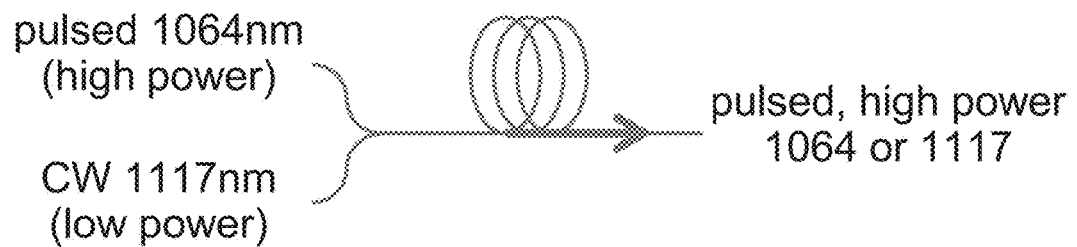
FIG. 2A illustrates a switchable 1-stage Raman design according to an embodiment of the application.

A detailed description of the illustrative embodiment will be discussed in reference to various figures, embodiments and aspects herein. Although this description provides detailed examples of possible implementations, it should be understood that the details are intended to be examples and thus do not limit the scope of the application.

Reference in this specification to "one embodiment," "an embodiment," "one or more embodiments," "an aspect" or the like means that a particular feature, structure, or characteristic described in connection with the embodiment is included in at least one embodiment of the disclosure. Moreover, the term "embodiment" in various places in the specification is not necessarily referring to the same embodiment. That is, various features are described which may be exhibited by some embodiments and not by the other.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

The present application describes a widely and rapidly tunable multi-wavelength laser and its methods of operation. The laser apparatus uses Raman amplification to controllably transfer power from an initial pump wavelength to one of a plurality of possible output wavelengths, where the possible range of output wavelengths can be large, and in particular can be many times the wavelength shift associated with a single stage of Raman amplification. The present apparatus uses cascaded Raman amplification across multiple Raman orders, but unlike prior art, it critically offers the ability to extract light at any of the Raman orders in the cascade, including the original pump wavelength. In so doing, it becomes possible to tune the laser in discrete steps over the entire Raman cascade. Cascaded Raman amplification has been extensively demonstrated in the prior art as an efficient means to transfer power from an initial wavelength across multiple Raman orders to a desired final output wavelength, but in the conventional architecture, there is no way to dynamically control the power transfer among the different orders and tune the output wavelength across multiple Raman orders.

The applications for the above-mentioned apparatus are unlimited, and they include detection of camouflaged objects, homemade explosives, weapons of mass destruction (WMDs) and illegally produced drugs. These applications also include gas sensing, monitoring industrial pollutants, monitoring industrial activity, and finding untapped natural resources.

Generally, Raman lasers are based on Raman scattering of light in a non-linear optical medium. The non-linear medium may include an optical fiber, such as a silica-based optical fiber. Raman scattering is a non-linear optical process that involves coupling of light propagating through some medium to molecular vibrations of the medium, with the result that light at an initial wavelength, commonly referred to as the pump wavelength, is re-radiated at a longer wavelength, commonly referred to as the Raman-shifted wavelength. The change in wavelength of the Raman-shifted light is determined by the quantum of energy lost to a molecular vibration, and Raman scattering provides optical amplification, or gain, at the Raman-shifted wavelength by transferring power from the pump wavelength to the Raman-shifted wavelength. The magnitude and shape of the Raman gain spectrum depends on the material, but for typical silica fibers the peak Raman gain occurs at a frequency shift of approximately 13 THz (~50 nm near 1,000 nm and ~100 nm near 1,500 nm), and the usable gain bandwidth is a few THz.

Since the Raman gain occurs at given frequency shift from the pump rather than at any particular absolute frequency, changing the pump wavelength changes the wavelength at which Raman gain occurs. The ability to vary the pump wavelength over a wide range therefore creates the ability to vary the Raman gain spectrum over a correspondingly large range, and Raman gain can be used in multiple cascaded steps to create light at new wavelengths that are separated from the original pump by multiple Raman shifts. In the instant application, Raman amplification is used in this cascaded manner as described below. In the first step, Raman gain is used to transfer the majority of the power from light at the original pump wavelength to a seed wavelength near the peak of the Raman gain spectrum, approximately one Raman shift away from the original pump wavelength. Raman-amplified light at that first seed wavelength can then become the pump to Raman amplify a second seed wavelength, and this second Raman amplification step is used to transfer the majority the power to the second seed. The amplified second seed now becomes the pump for a third seed, and this process can be continuously cascaded until the desired wavelength is reached. A schematic illustration of how energy is successively transferred from one Raman order to the next as light propagates down an optical fiber is shown below in FIG. 1.

According to FIG. 1, the initial wavelength at the pump propagates through an optical fiber or other Raman gain medium for a sufficient distance to transfer light from an original pump wavelength in four steps to a final output wavelength of $\lambda_{seed\ 4}$. Such cascaded Raman gain amplification is well known in the prior art and has been used in both cascaded amplifiers and in a type of laser known as cascaded Raman resonators as way to transfer power from light at an initial pump wavelength across multiple Raman orders to some particular final wavelength that is chosen in advance when the system is built.

In the prior art, the majority of the power is always emitted at the final wavelength, and there is no adequate means to control the cascaded Raman process such that user can dynamically change the primary output wavelength by changing how many steps in the Raman cascade occur. The present invention is different from the prior art because it provides the ability to controllably extract or "drop" any of the wavelengths at any desired step along the Raman cascade, including the original pump wavelength. Thus, the laser in this invention may be tuned in discrete steps over the entire Raman cascade. In the current invention, the wavelength at which the majority of the power is emitted from the laser will be referred to hereafter as the output wavelength. According to the application, the present invention provides this discrete tunability of the output wavelength by including the ability for any of the seed lasers to be rapidly turned off and on.

FIG. 2A illustrates the simplest case of turning on and off a single seed laser to control the output wavelength. A high-power pump laser and a low-power seed laser are launched into a length of fiber selected to provide an appropriate amount of Raman gain. In the illustrated example, the high power pump laser is at a wavelength of 1,064 nm and the low power seed laser is 1117 nm. In some cases it may be convenient for the pump laser to be a low-duty-cycle pulsed laser with high peak power (e.g. >1 kW) and a much lower average power (e.g. 100 mW), while the seed laser could be a continuous wave (CW) laser. In this case, the Raman gain will occur only during the times when both a laser pulse from the pump laser and the CW laser are simultaneously present in the fiber.

Figure 2B:
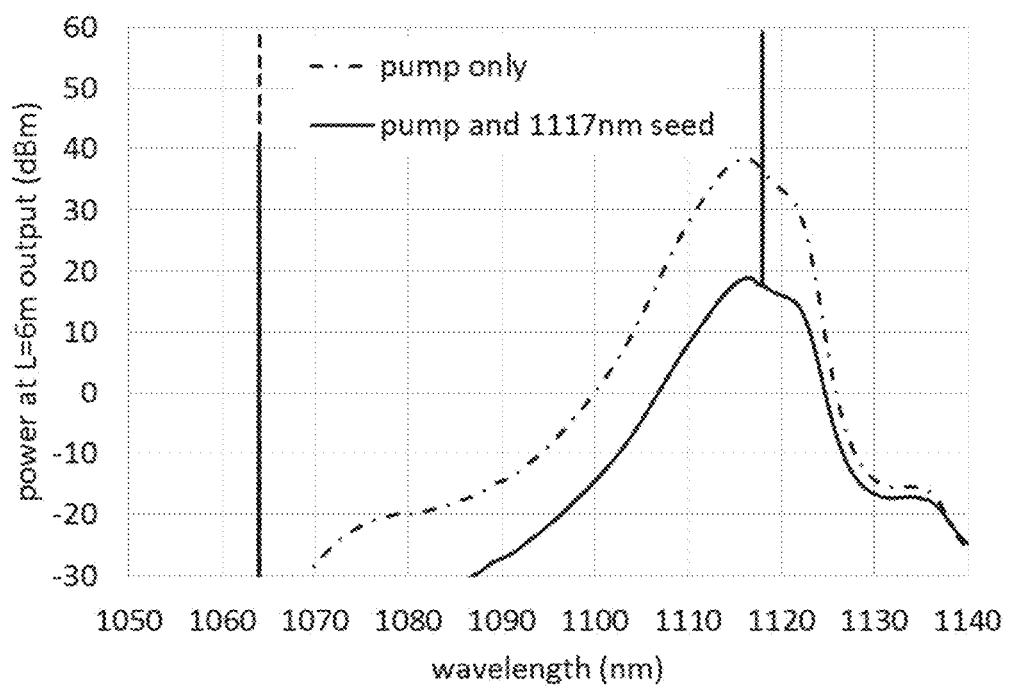
FIG. 2B illustrates a simulated output spectra when the seed laser is turned on and off according to an embodiment of the application.

FIG. 2B shows exemplary simulations of the optical output spectrum for the cases where a 1 mW seed at 1117 nm is turned on and off in the presence of a strong 1064 nm pump at an initial pump power of 1 kW (+60 dBm). When the seed is turned off dashed curve), the tall but narrow peak at the 1064 nm pump wavelength shows that almost all of the output power remains at the original pump wavelength. When the seed is tuned on (solid curve), the tall but narrow spike at 1117 nm shows that power was efficiently transferred from the 1064 nm pump wavelength to the 1117 nm seed wavelength. In this case, light at the seed wavelength was amplified from its initial power of 1 mW almost up to the original+60 dBm (1000 W) power of the pump, and only a relatively small amount of residual power remains at the pump wavelength (~+41 dBm, or ~12 W). Using this approach, the predominant wavelength of the output can be switched between two possible values (1064 nm and 1117 nm) as rapidly as the low-power seed can be turned on and off. In the case where the pump laser is pulsed, the laser can switch wavelengths between one pulse and the next as long as the seed laser can be switched faster than the time between pulses. For some embodiments, the time between pulses could be 10 to 100 microseconds, while the switching speed for the seed laser can easily be 1 nanosecond or less. In some embodiments, the pump may also be CW.

Raman Amplified Spontaneous Emission (ASE) is a term commonly used to describe Raman-generated light that is generated at wavelengths longer than the pump even when no seed laser is present, and the dashed curve in FIG. 2B shows the generation of Raman ASE over a large range of wavelengths from ~1070 nm to ~1135 nm, with a peak near 1117 nm. In cases of extremely high Raman gain (e.g. ~90 dB or more), it is possible for so much Raman ASE to be generated that most of the pump power is lost to Raman ASE, and this is referred to as spontaneous Raman conversion. In the example illustrated in FIG. 2B, the amount of Raman gain in the fiber span (~60 dB) was chosen to keep the ASE more than 20 dB below the desired output at the pump wavelength of 1064 nm. However, if an additional 20-30 dB or more of Raman gain were present in this span, then a majority of the pump power would spontaneously convert to Raman ASE even without the seed present.

The present invention addresses a fundamental problem that occurs with excessive, unwanted Raman ASE when an attempt is made to cascade multiple orders of seeded Raman amplification. To make a laser with N cascaded Raman shifts, is necessary to have a fiber span with a total Raman gain that is N times the amount of gain needed to create a single Raman shift. In these cases the total Raman gain is so high (e.g. >90 dB) that spontaneous Raman conversion will prevent the extraction of early Raman orders in most practical cases.

Figure 3A:
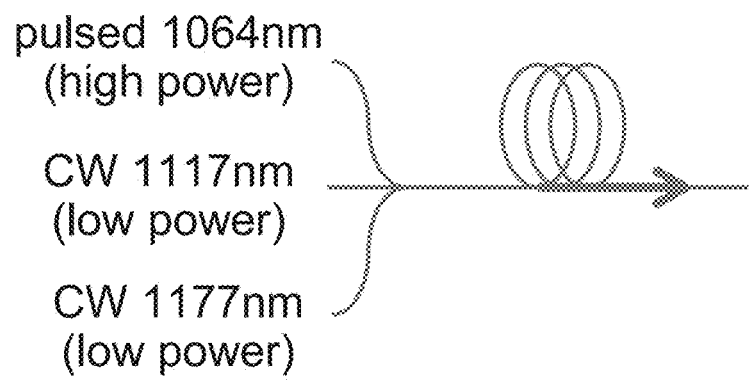
FIG. 3A illustrates a laser design with a longer fiber coil to support 2 Raman cascades according to an embodiment of the application.

This problem is illustrated in FIG. 3A which shows a configuration where a high-power pump laser light at 1064 nm is injected into a fiber along with light from two low-power seeds in a configuration that does not have the key feature that is used in the present invention. One of the seed lasers in this example is 1117 nm and the other seed laser light is 1177 nm. The number of seeds is directly proportional to the length of the fiber. Here, the fiber length is approximately twice as long as the fiber length shown in FIG. 2A in order to support two cascaded orders of Raman conversion. As described below, this case illustrates the need for the current invention because the additional Raman gain needed to support the second Raman conversion step prevents the original pump wavelength from being a possible output wavelength.

Figure 3B:
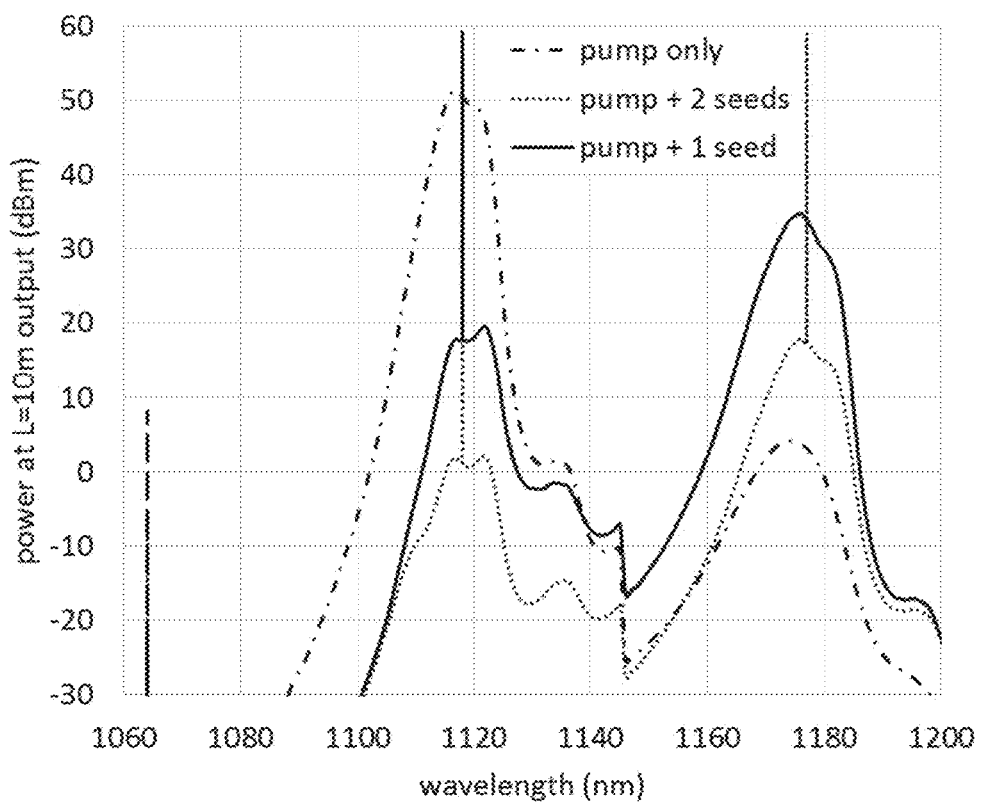
FIG. 3B illustrates a simulated output when the 2 seed lasers are turned on and off in different combinations without the key design features of the application.

FIG. 3B shows exemplary simulations of the optical output spectrum for this configuration with seed laser powers of 1 mW and a pump power of 1 kW (+60 dBm) for three cases: case 1, where the pump and both seeds are launched into the fiber (dotted line); case 2, where the 1177 nm seed is turned off and only the pump and the 1117 nm seed are launched into the fiber (solid line); and case 3, where both seeds are turned off and only the pump is launched into the fiber (dashed line). For case 1 where both seeds are on, the cascaded Raman process occurs as needed for an 1177 nm output wavelength: most of the power from the original pump is transferred across two Raman orders to the wavelength of the second seed at 1177 nm. For case 2 where only the 1117 nm seed is on, the Raman process occurs as needed for an 1117 nm output wavelength: most of the power from the original pump is transferred to the wavelength of the first seed at 1117 nm, and only a small amount of Raman ASE is created around 1177 nm. Case 3 where only the pump is turned on illustrates the problem addressed by the current invention: because of the high Raman gain, the pump spontaneously transfers all its energy to Raman ASE near 1117 nm and the effective output wavelength is still approximately 1117 nm like it was in case 2. In this configuration, there is no way to access the original pump wavelength as a possible output wavelength of the laser.

The present invention makes it possible to construct a cascaded Raman laser with an output wavelength that can be tuned to any of the wavelength steps in the Raman cascade, including the original pump wavelength, by turning on and off different combinations of seed lasers. The present invention further accomplishes this goal by reducing and/or eliminating unwanted spontaneous Raman conversion by providing a means to extract or "drop" the desired wavelength before too much Raman gain accumulates.

Figure 4:
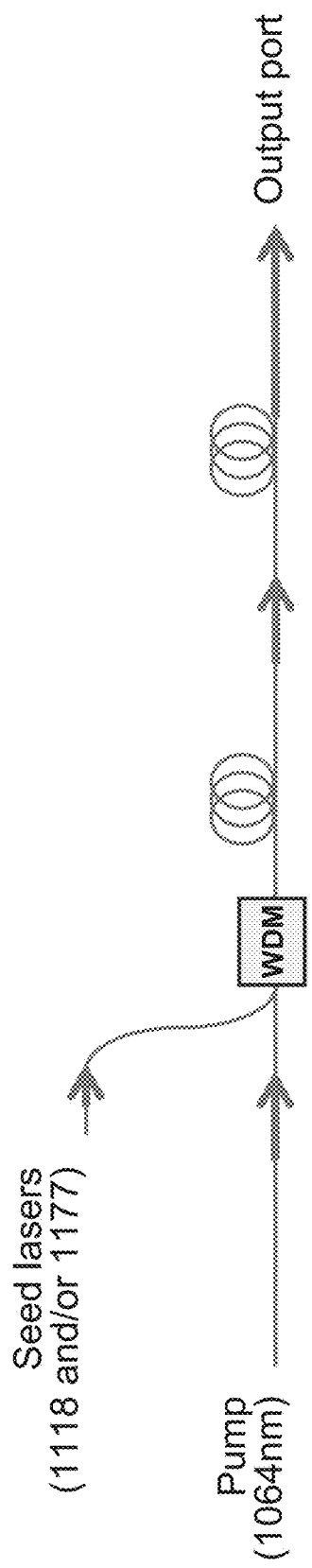
FIG. 4 illustrates a simple architecture where the pump and Seed 1 and/or Seed 2 are combined at a first WDM.
Figure 5:
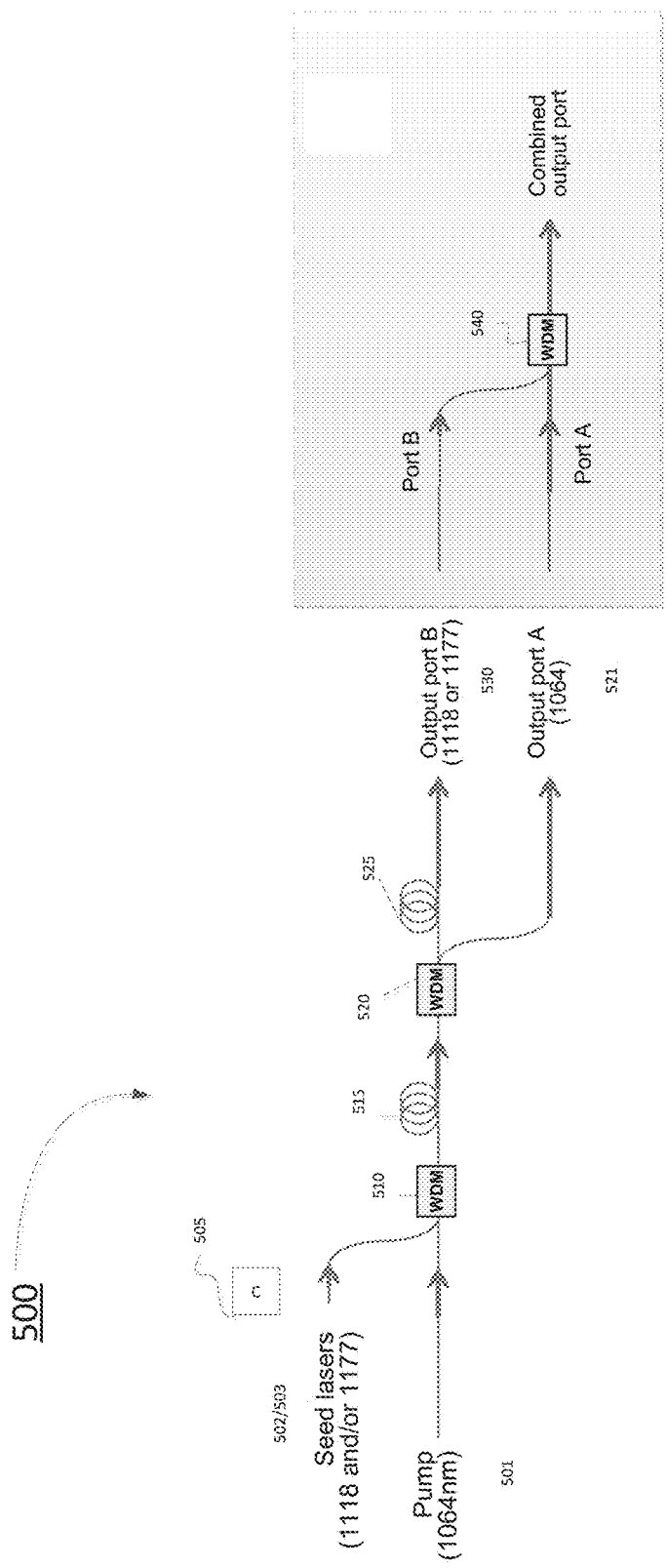
FIG. 5 illustrates an embodiment of the application that uses two Raman cascades to enable the selection of 1 among 3 possible wavelengths, along with a means to combine all wavelengths into a single output fiber.

One embodiment of the present invention is shown in FIG. 5, whereby the apparatus 500 allows selection of any output wavelength. This embodiment is the same as the problematic configuration shown in FIG. 4, but with the critical addition of a second WDM 520 between the two fiber coils 515 and 525, approximately half-way along the total length of the Raman gain fiber. In this embodiment, the pump 501, a first seed laser 502 and a second seed laser 503 are combined at a first optical combiner 510. It is preferred for the wavelength of the first seed laser to be near the peak of the Raman gain generated by the pump laser. For an exemplary pump wavelength of 1064 nm, a preferred wavelength for the first seed laser is 1117 nm. Similarly, it is preferred for the wavelength of the second seed laser to be near the peak of the Raman gain generated by a pump at the wavelength of the first seed. For a first seed wavelength at 1117 nm, a preferred wavelength for the second seed laser is 1177 nm. Seed lasers may include, for example, low-power semiconductor seeds lasers. Many instantiations will require a seed laser with the ability to generate a peak power of only a few mW, and the power consumption of the seed lasers can be negligible compared to the pump if efficient drivers are chosen.

The first combiner 510 may also be referred to as an optical filter or wavelength division multiplexer (WDM). Examples of optical filters include but are not limited to thin-film filters, Fiber Bragg Grating (FBG) filters, Long-Period fiber Grating (LPG) filters, and fused-fiber WDMs. According to an embodiment, fused-fiber WDMs are particularly attractive because of their low intrinsic loss, e.g., as low as 0.1 dB, and they also offer excellent reliability at high power.

A controller 505 for the two seed lasers may be employed to turn them on and off to thereby select the desired output wavelength. Consider the same three seed laser configurations described above in the discussion of the apparatus from FIG. 3A. In case 1, the pump and both seeds are all turned on and launched into the first fiber coil 515. This first coil is configured to have sufficiently large Raman gain for the majority of the power from the pump wavelength to be transferred to the 1117 nm wavelength of the first seed when the first seed is turned on, but also to have sufficiently small Raman gain that a second step of substantial Raman conversion to 1177 nm does not occur. The second WDM (520) is configured so that any light at the 1064-nm pump wavelength is dropped at Port A, but any light at either of the seed wavelengths (1117 nm and 1177 nm) is launched into the second fiber coil 525. In case 1, at the output of the first fiber coil 515, the majority of the power from the pump has been transferred to the 1117 nm wavelength of the first seed, and this high-power 1117 nm light is launched into the second fiber coil 525 along with light from the second low-power seed at 1177 nm. The second coil is configured such that there is sufficient Raman gain for the majority of the power from the previously-amplified 1117 nm light to be transferred to the 1177 nm wavelength of the second seed, but also to have sufficiently small Raman gain that a third step of substantial Raman conversion to even longer wavelengths does not occur. In case 1, the output wavelength of the laser is therefore 1177 nm, and the output is emitted at Port B 530.

In case 2, the second seed at 1177 nm is turned off, and only the pump and first seed at 1117 nm are launched into the first fiber coil 515. As with case 1, Raman gain in the first fiber coil 515 again transfers most of the power from the pump to the wavelength of the first seed, and high-power light at 1117 nm passes through the second WDM 520 such that it is launched into the second fiber coil 525. Although the second fiber coil is configured to provide enough Raman gain to amplify the 1177 nm seed when that seed is turned on, it is further configured to have a small enough amount of Raman gain that spontaneous conversion of the high-power 1117 nm light to 1177 nm does not occur when the second seed is turned off. As a result, in case 2 the output wavelength is therefore 1117 nm, and the output is emitted at Port B 530.

In case 3, both seeds are turned off and only the pump is launched in the first fiber coil 515. Although the first fiber coil is configured to provide enough Raman gain to amplify the 1117 nm seed when that seed is turned on, it is further configured to have a small enough amount of Raman gain that spontaneous conversion of the high-power 1064 nm light to 11177 nm does not occur in the first coil when the first seed is turned off. The majority of the power is still at 1064 nm when the light reaches the second WDM 520, and the high-power light at 1064 nm is then dropped by the second WDM and emitted at Port A as the laser's output wavelength. No unwanted spontaneous Raman conversion occurs in the second fiber coil 525 because the WDM prevented the launch of high-power light into the second coil. The wavelength switching functionality of this configuration for the different input state configurations of the seed lasers is summarized below in Table 1.

TABLE 1

| Input State | | | Output Predominant output wavelength |
|---|---|---|---|
| 1064 nm pump | 1117 nm seed | 1177 nm seed | |
| On | Off | Off | 1064 |
| On | On | Off | 1117 |
| On | On | On | 1177 |

For some applications it may be acceptable or even preferable for the different possible output wavelengths to be emitted from different ports (e.g. Ports A and B), but for applications where it is important for all wavelengths to be emitted from a common output port, it is possible in one embodiment of the invention to include a third WDM 540 that is used to combine Ports A and B into a common output.

The apparatus will always emit some light at unwanted wavelengths other than the predominant output wavelength because of either incomplete Raman conversion to the desired wavelength, or because of unwanted Raman ASE. Light at unwanted wavelengths is one factor that tends to reduce the efficiency of the laser, and this efficiency reduction can be minimized by design optimizations that include optimization of the amount of Raman gain, use of optical pulses from the pump that have a nearly square temporal shape (when a pulsed pump is used), and management of the polarization of the pump and seed lasers. In some cases it may be advantageous to use polarization maintaining fibers to assure that the polarizations of all the lasers remain aligned.

Here, the Raman gain medium can be implemented using any suitable medium that supports Raman amplification. While typically a unitary component, the Raman gain medium may comprise a plurality of elements. The Raman gain medium may include two or more fibers that are connected to each other. Optical fiber is available with a wide variety of core sizes and is an excellent Raman medium for implementing this invention for pump laser peak powers ranging from fractions of a Watt to hundreds of kilowatts. Since the required Raman fiber length is inversely proportional to peak intensity, long fiber lengths and small core sizes are required for low peak powers. In addition, depending upon a given application, it may be desirable to implement the Raman gain medium using an optical fiber that, in addition to being suitable for Raman amplification, also has one or more further desired properties. For example, a polarized system output may be desired. In that case, the Raman gain medium may comprise a polarization-maintaining Raman fiber or polarization-maintaining Raman filter fiber. Further, if stimulated Brillouin scattering (SBS) is an issue, the Raman gain medium may comprise an SBS-suppressing Raman fiber or an SBS-suppressing Raman filter fiber. It is further noted that the Raman gain medium 34 may be configured to include other optical devices, such as gratings, or the like.

For pump lasers with a peak power on the order of 1 kW and core sizes on the order of 6 microns, the typical fiber lengths for each Raman span is on the order of about 10 meters. This small amount of fiber can be very compactly spooled into a small package. Many MWLRS applications of greatest interest can be addressed by a laser producing nanosecond-class pulses with an average power on the order of a few hundred mW and a peak power on the order of a few kW. Pump lasers with much higher peak power are available for applications that require it, but for high peak powers, careful design is required to assure that excessive Raman gain does not occur in the WDM filters or their fiber pigtails. In these cases it may be advantageous to use fibers with a larger core to prevent the required fiber lengths from becoming inconveniently short. For extremely high peak powers (>100 kW), applications may be implemented using free-space beams without the use of optical fiber. In these cases, a different filter technology would be chosen, and a Raman gain medium with a gain coefficient much higher than fused silica could also be used.

A variety of possible pump lasers are available, both CW and pulsed, using technologies that include Q-switched YAG lasers and fiber lasers.

As described above, the instantiation shown in FIG. 5 can provide tuning of the output wavelength between Raman orders by using a controller to turn on and off the different seed lasers. This instantiation has some advantages, including the fact that WDMs with a relatively broad filter function can be used since they only need to separate wavelengths that are widely spaced (e.g. 1064 nm and 1117 nm). Another possible instantiation is to use the same general configuration shown in FIG. 5, but with tunable seed lasers. In this instantiation, the WDMs would be implemented as narrow-bandwidth drop filters designed such that tuning the seed laser on or off the filter passband can be used as a way to controllably drop the desired Raman order. In this instantiation, controllers that tune each seed laser would be used instead of controllers that turn each seed laser on or off. The amount of seed laser tuning required to move on and off a filter passband could be very small (e.g. <1 nm) in comparison to the width of the Raman gain spectrum so that the amount of tuning required to control whether a given seed wavelength is dropped after amplification or used to pump the next stage in the Raman cascade will not significantly affect how much it was amplified.

One particularly attractive implementation of this tuning-based drop functionality is to use fibers that support multiple modes along with fiber gratings to selectively couple between modes. In this case, the pump and all seed wavelengths are launched into a fiber mode with small effective area, ideally the fundamental mode. The fiber length is chosen such that when all seeds are present, the Raman order with the longest desired wavelength is emitted in the fundamental mode at the output. Narrow-bandwidth fiber gratings for each order are distributed throughout the length of the fiber such that there is a grating present for each desired Raman order at a position where efficient conversion to that Raman order has occurred, but significant conversion to the next order has not yet begun. This is analogous to the WDMs shown in FIG. 5.

In this embodiment, the fiber gratings are designed to couple a narrow range of wavelengths within that Raman order from the small-effective-area mode to a large-effective-area mode. This is commonly done in Higher Order Mode (HOM) fibers developed by companies such as OFS for both dispersion compensation and for high-power fiber laser applications, and the high-order mode in these fibers can have an effective area that can be 1 to 2 orders of magnitude larger than the fundamental mode. When the user wishes to tune to the laser to a particular Raman order, the seed for that order is tuned to the grating wavelength and coupled into the large-area HOM where it propagates through the rest of the fiber with much lower intensity and effectively with no additional Raman gain. A second identical grating for each Raman order is also positioned at the output end of the fiber to couple back into the fundamental mode of the fiber before light leaves the laser.

Figure 6:
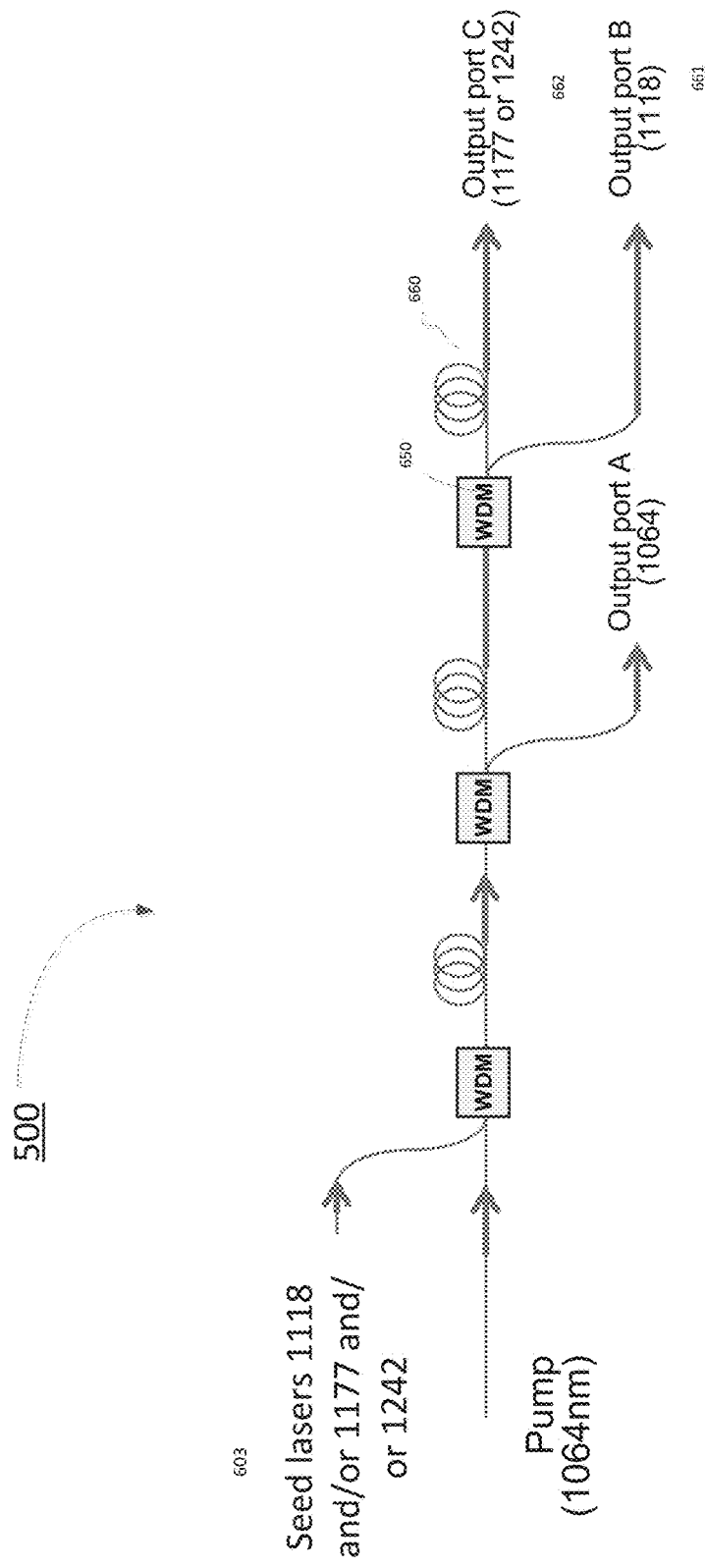
FIG. 6 illustrates an architecture that includes a third seed laser and third Raman cascade according to another embodiment of the application.

The instantiation shown in FIG. 5 with two seed lasers, two WDMs, and two Raman coils can be generalized to include additional seeds, WDMs, and coils to provide as many additional Raman conversion steps as desired. According to these embodiments, 'N−1' WDMs are required to provide access to N different possible wavelengths, and no WDM drop port is needed at the output of the final Raman span whereby the last or the second to last wavelength is output therefrom An example of this generalization is shown in the embodiment of FIG. 6, the laser apparatus 500 includes a third seed laser 603 at 1242 nm, a third WDM 650, and a third fiber coil 660 are also employed. The additional fiber coil is added to provide the additional Raman gain necessary to transfer power from the amplified 1177 nm seed to 1242 nm, and the additional WDM is added to enable extraction of amplified light at 1117 nm if that is the desired wavelength. Analogous to the apparatus described above and shown in FIG. 5, the output wavelength is 1064 nm when only the pump is turned on, and this wavelength is dropped at WDM 630 to output port A. The output wavelength is 1117 nm when the pump and first seed are turned on, and this wavelength is dropped at WDM 650 to output port B. The output wavelength is 1177 nm when the pump, the 1117 nm seed, and the 1177 nm seed are all turned on, and this wavelength is emitted at output port C. The output wavelength is 1242 nm when the pump and all three seeds are turned on, and this wavelength is also emitted at output port C. The wavelength switching functionality of this configuration for the different input state configurations of the seed lasers is summarized below in Table 2.

TABLE 2

| Input State | | | | Output Predominant |
|---|---|---|---|---|
| 1064 nm pump | 1117 nm seed | 1177 nm seed | 1242 nm seed | output wavelength |
| On | Off | Off | Off | 1064 |
| On | On | Off | Off | 1117 |
| On | On | On | Off | 1177 |
| On | On | On | On | 1242 |

Figure 7:
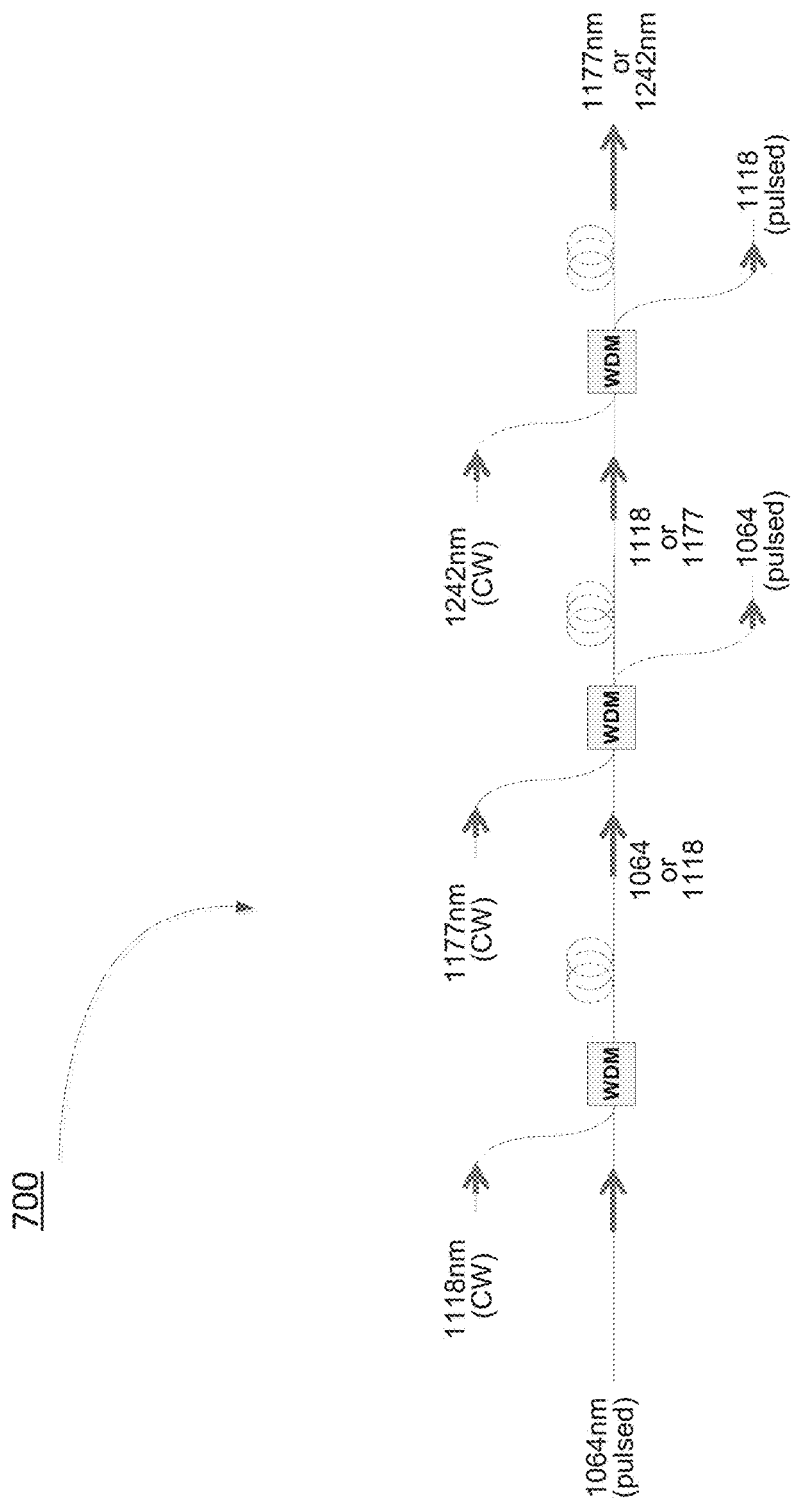
FIG. 7 illustrates an architecture where seeds can be launched at separate, discrete locations according to another embodiment of the application.

According to another embodiment as shown in FIG. 7, the apparatus 700 may have seeds which are launched at separate, discrete locations. That is, the multiple seed lasers do not have to collectively be launched into the first WDM. Instead, the first, second third and fourth seed lasers may be launched into respective WDMs. Alternatively, two or more seed lasers may be launched into a WDM, while at least one seed laser is launched into another WDM. The periodic nature of the fused fiber WDM enables the particularly efficient architecture show here, where a single WDM can be used to both add the next seed and to provide a drop port for the previous Raman order. However, it is envisaged that separate WDMs, or separate filters using a different filter technology, could also be used to drop the previous order and add the next seed.

Figure 8A:
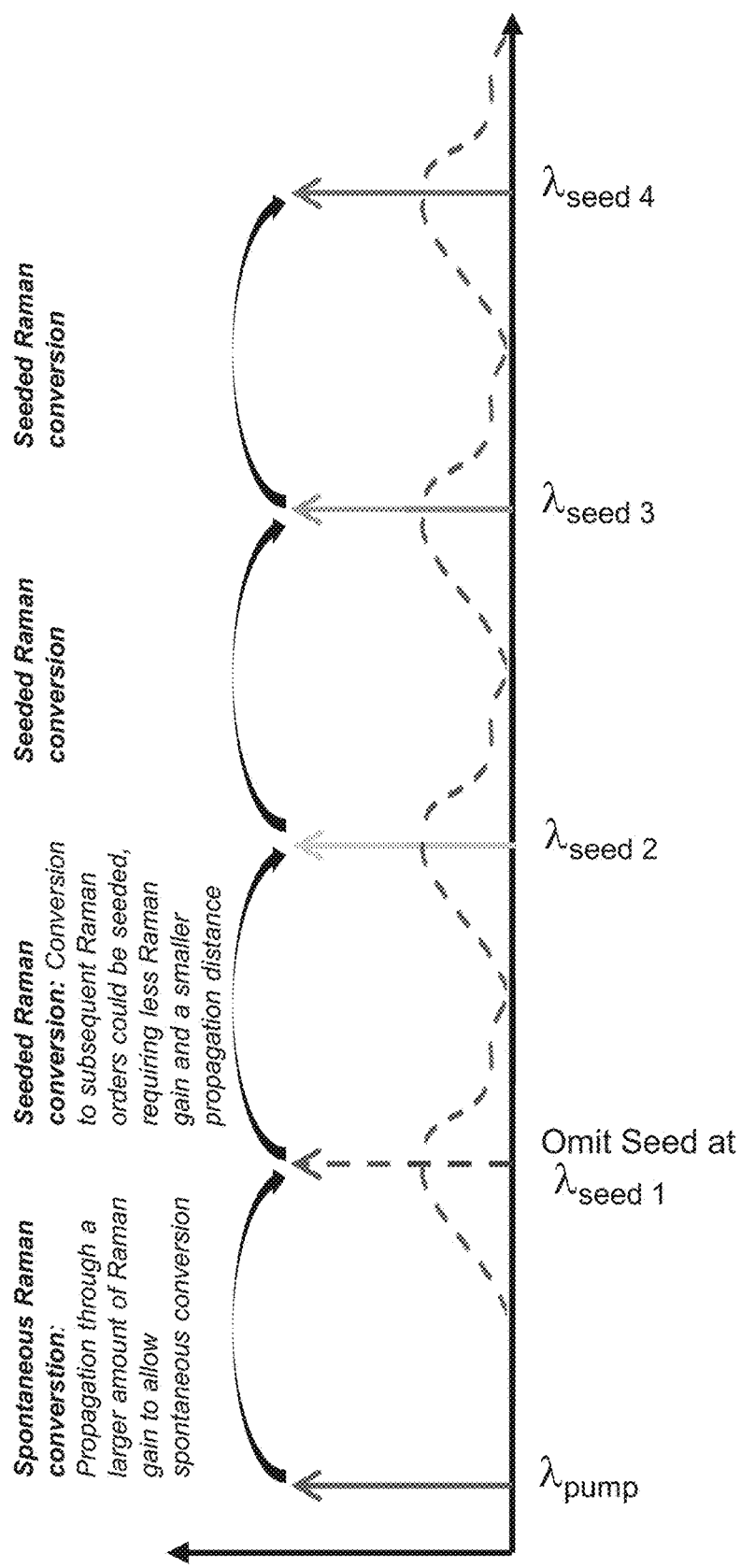
FIG. 8A illustrates spontaneous Raman conversion in combination with launching one or more seeds at specific wavelengths according to another embodiment of the application.

According to a further embodiment of the application as shown in FIG. 8A, spontaneous Raman conversion may occur for some, but not all, intermediate orders. As illustrated, light propagates from $\lambda_{pump}$ to a wavelength to a location where $\lambda_{seed1}$ would typically be located and on to $\lambda_{seed\,2}$. Light propagates with a larger amount of Raman gain to allow for spontaneous Raman conversion at $\lambda_{seed\,2}$. Then, seeded Raman conversion may occur at one or more subsequent Raman orders. As shown, the seeds are maintained at $\lambda_{seed\,2}$, $\lambda_{seed\,3}$ and $\lambda_{seed\,4}$. Alternatively, a seed of $\lambda_{seed\,1}$ could be included while one or more of $\lambda_{seed\,2}$, $\lambda_{seed\,3}$ and $\lambda_{seed\,4}$ are omitted. In so doing, a larger wavelength range is covered with a reduced number of seed lasers. According to the application, while the wavelength range is increased, the number of controllable output wavelengths is limited by the number of seeds.

Figure 8B:
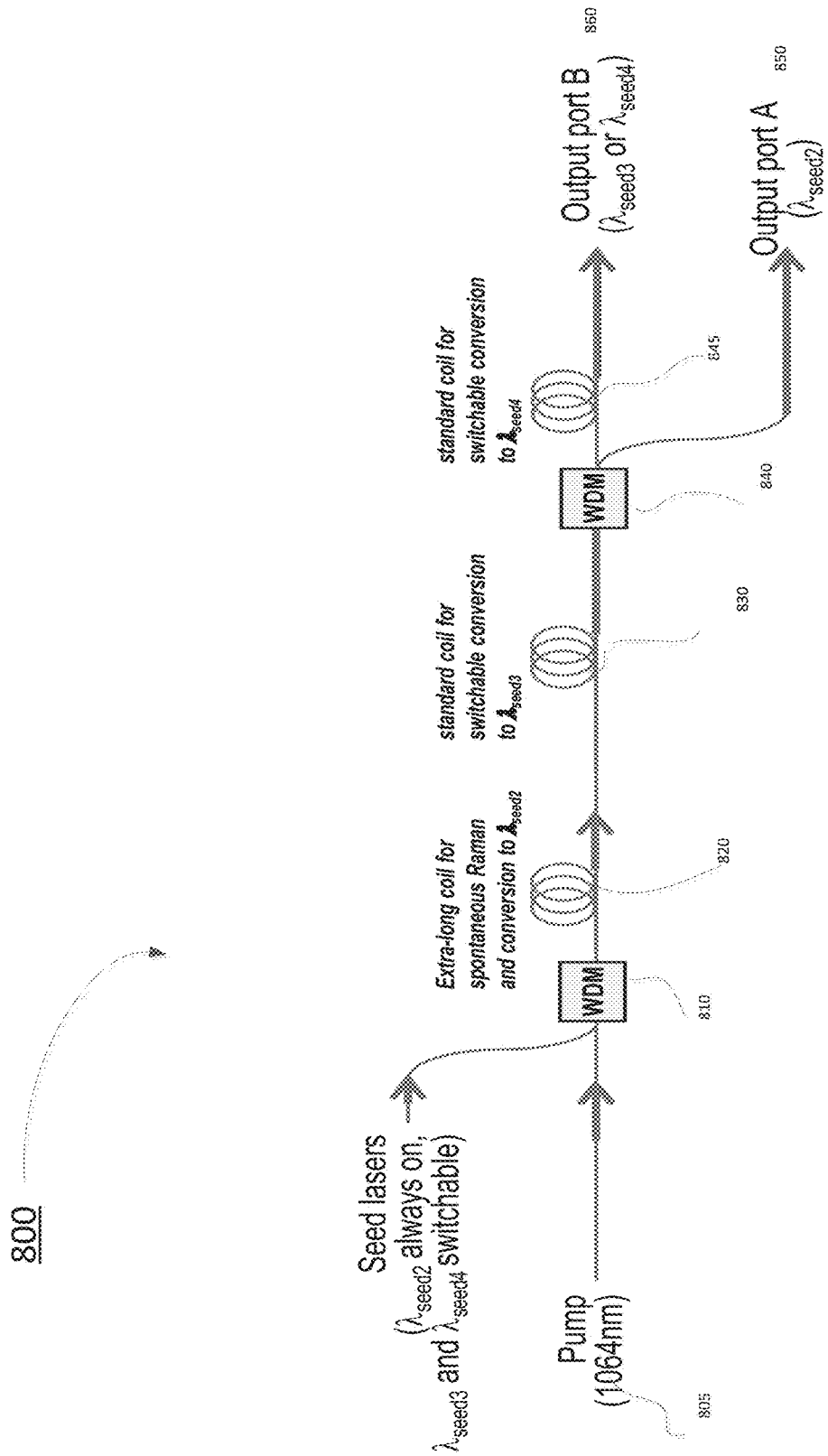
FIG. 8B illustrates an architecture according to FIG. 8A.

The concept of FIG. 8A is more clearly illustrated via the system 800 in FIG. 8B. Here, a pump 805 in addition to one or more seed lasers, such as $\lambda_{seed\,2}$, $\lambda_{seed\,3}$ and $\lambda_{seed\,4}$, are located upstream of the WDM 810. $\lambda_{seed\,2}$ is always on. Meanwhile $\lambda_{seed\,3}$ and $\lambda_{seed\,4}$ switchable between on and off. Downstream of the WDM 810 is an extra-long coil 820 for Spontaneous Raman conversion at $\lambda_{seed\,2}$. Also included is a standard coil 830 for switchable conversion to $\lambda_{seed\,3}$. Another WDM 840 is located downstream of the standard coil 830. An output port A 850 is located downstream of the WDM 840 for outputting $\lambda_{seed\,2}$. Likewise, an output port B 860 is located downstream of the WDM 840 and another standard coil 845. The output port 860 outputs either $\lambda_{seed\,3}$ or $\lambda_{seed\,4}$.

Table 3 as shown below provides the input and output states based upon $\lambda_{seed\,2}$, $\lambda_{seed\,3}$ and $\lambda_{seed\,4}$. Since spontaneous Raman conversion occurs in this embodiment, $\lambda_{seed\,1}$ is omitted and hence turned off.

TABLE 3

| | Input State | | | | Output Predominant output wavelength |
|---|---|---|---|---|---|
| Pump | $\lambda_1$ seed (omitted) | $\lambda_2$ seed | $\lambda_3$ seed | $\lambda_4$ seed | |
| On | Off | On | Off | Off | 1177 |
| On | Off | On | On | Off | 1242 |
| On | Off | On | On | On | 1314 |

According to yet even a further embodiment, every wavelength is emitted from a separate fiber. For example, the final output of the apparatus 500, 700 and 800 having either of two wavelengths, e.g., last and second-to-last wavelengths, emitted from the last fiber, can be further separated. This may be convenient for certain applications. In other applications, it may be preferable to emit all possible wavelengths from a single fiber, and this is the default configuration for most MWLRS systems.

Figure 9:
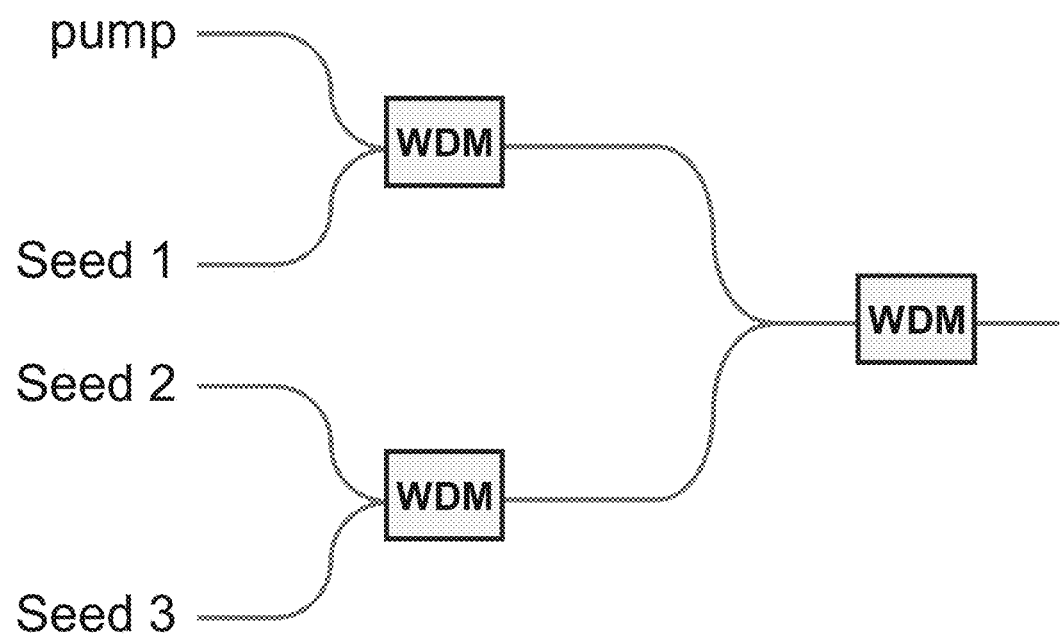
FIG. 9 illustrates a re-combination of all wavelengths extracted from a laser apparatus using a binary tree of wavelength division multiplexers according to an embodiment of the application.

Further, it may be possible to re-combine all the wavelengths extracted from the apparatus, along with the wavelengths output from the last fiber, using a binary tree of WDMs. This is illustrated in FIG. 9. So, if there are 'N' accessible Raman orders, and if 'N' is a power of 2, then (N-1) additional WDMs will be required to recombine all wavelengths into a single fiber. As such, each individual wavelength will only need to traverse $\log_2$ (N) additional WDMs.

While the systems and methods have been described in terms of what are presently considered to be specific aspects, the application need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

What is claimed is:

1. A method for controlling an output of a laser apparatus comprising:
    receiving, at a first multiplexer, an initial wavelength from a pump;
    receiving first and second seed wavelengths from a first and a second seed source, respectively;
    sending an output of the first multiplexer to a first fiber;
    combining, at a second multiplexer, an output of the first fiber;
    extracting the initial wavelength with the second multiplexer; and
    sending the first and seed wavelengths to a second fiber.
2. The method of claim 1, further comprising:
    controlling an output of the first, second or both seed sources.
3. The method of claim 1, further comprising:
    sending the extracted initial wavelength to an output device.
4. The method of claim 1, further comprising:
    receiving the second seed wavelength at the first multiplexer.
5. The method of claim 1, further comprising:
    receiving the second seed wavelength at the second multiplexer.
6. The method of claim 5, further comprising:
    controlling, via a controller, an output of the second seed source.
7. The method of claim 1, further comprising:
    receiving a third seed wavelength;
    sending the output from the second fiber to a third multiplexer;
    extracting the first seed wavelength from the third multiplexer; and
    sending the output from the third multiplexer to a third fiber for Raman amplification at the third seed wavelength.
8. The method of claim 7, further comprising:
    combining the extracted initial wavelength, the first seed wavelength and an output of the third combiner into a single fiber for emission.
9. The method of claim 1, further comprising:
    combining, downstream of the second multiplexer, light output from at least two of the initial, the first and the second wavelengths outputs into a single fiber.
10. The method of claim 1, wherein
    N is a number of different Raman orders generated within the apparatus, and
    'N-1' is a total number of multiplexers.
11. The method of claim 10, wherein
    a length of the first and the second fibers is proportional to the number of different Raman orders 'N', and
    the length of the first or the second fiber is increased such that spontaneous Raman conversion occurs at least at one of the Raman orders 'N' without the use of a seed laser that corresponds to that wavelength.

12. The method of claim 1, wherein a laser of the pump is pulsed or a continuous wave.

13. The method of claim 12, wherein a pump laser light of the pump has peak power ranging from about 100 watts to 1 KW.

14. The method of claim 13, wherein a first seed laser light of the first seed laser has power ranging between 1 mw and 100 watts.

15. The method of claim 1, further comprising:
tuning between at least three discrete wavelengths to provide additional orders of Raman amplification by including one or more additional seed lasers, multiplexers and fibers.

* * * * *